(12) United States Patent
Wilson

(10) Patent No.: US 9,059,589 B2
(45) Date of Patent: Jun. 16, 2015

(54) BUTANE FREE RECHARGEABLE CHARGER LIGHTER WITH SOLAR POWER

(76) Inventor: Emmitt Thomas Wilson, Rochester, NY (US)

( * ) Notice: Subject to any disclaimer, the term of this patent is extended or adjusted under 35 U.S.C. 154(b) by 361 days.

(21) Appl. No.: 13/478,784

(22) Filed: Aug. 6, 2012

(65) Prior Publication Data

US 2014/0035508 A1  Feb. 6, 2014

(51) Int. Cl.
*H01M 10/44* (2006.01)
*H01M 10/46* (2006.01)
*H02J 7/00* (2006.01)
*F23Q 2/00* (2006.01)

(52) U.S. Cl.
CPC .................. *H02J 7/0042* (2013.01); *F23Q 2/00* (2013.01)

(58) Field of Classification Search
CPC ..... H02J 7/0042; H02J 7/0054; H02J 7/0055; H02J 7/35; F23Q 2/00; H01M 10/44; H01R 13/6675; H01R 31/065
USPC .................................. 320/101, 107, 166, 110
See application file for complete search history.

(56) References Cited

U.S. PATENT DOCUMENTS

| | | | |
|---|---|---|---|
| 3,392,265 A | 7/1968 | King et al. | |
| 3,448,365 A | 6/1969 | Jacobson | |
| 3,621,196 A | 11/1971 | Sammet | |
| 3,934,302 A | 1/1976 | Mabuchi | |
| 4,254,761 A * | 3/1981 | Armas et al. | 126/680 |
| 4,288,209 A * | 9/1981 | Yoshinaga | 431/255 |
| D312,707 S | 12/1990 | Demory | |
| 5,235,157 A | 8/1993 | Blackburn | |
| 5,274,214 A | 12/1993 | Blackburn | |
| 5,285,050 A | 2/1994 | Blackburn | |
| 5,354,968 A | 10/1994 | Yamamura | |
| 6,644,303 B1 | 11/2003 | Worthington et al. | |
| 8,228,024 B1 * | 7/2012 | Zander | 320/107 |
| 2008/0174989 A1 * | 7/2008 | Robinett | 362/183 |

* cited by examiner

*Primary Examiner* — Brian Ngo

(57) ABSTRACT

A lighter rechargeable in nature, and complimenting any other hand held device by means of electronic energy transfer.

8 Claims, 1 Drawing Sheet

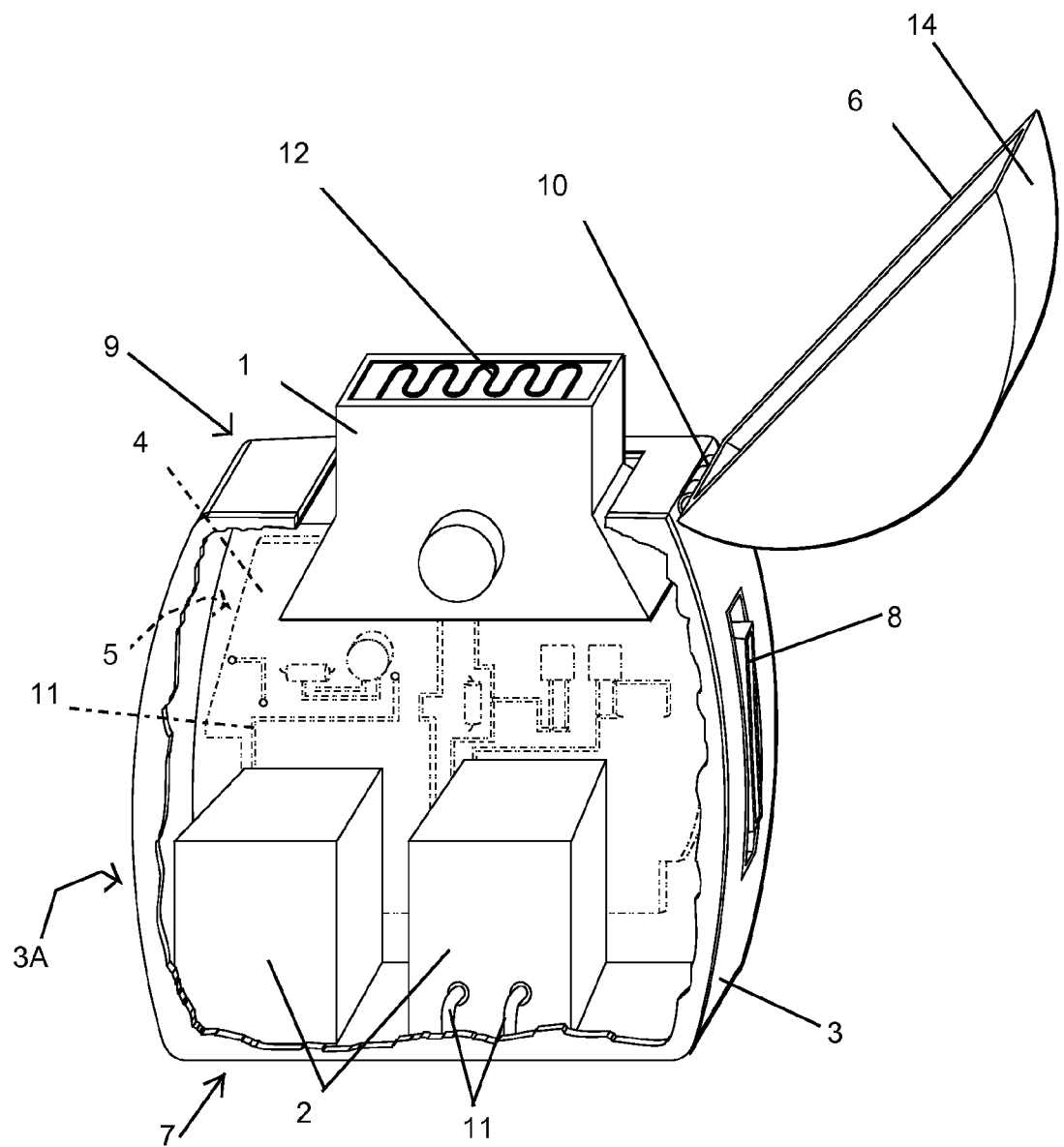

BUTANE FREE RECHARGEABLE CHARGER LIGHTER WITH SOLAR POWER

BACKGROUND AND SUMMARY

Any fire, and or heat producing device, rechargeable in nature, and its desired function is to charge other devices as well as ignite to flame what so ever the consumer wishes. Any portable back up energy source designed for complimenting any other hand held device by means of electronic energy transfer in any shape or fashion and all things embodied in the specifications of this device, to be of my conception. Egg shape represents the birth of innovation of combined technology. Bringing the world together as well as its devices.

BRIEF DESCRIPTION OF DRAWING

The FIGURE illustrates an egg-shaped embodiment of the rechargeable charger and lighter with solar.

DETAILED DESCRIPTION

Disclosed is a fire, and or heat producing device, rechargeable in nature, and its desired function is to charge other devices as well as ignite to flame what so ever the consumer wishes. Any portable back up energy source designed for complimenting any other hand held device by means of electronic energy transfer in any shape or fashion and all things embodied in the specifications of this device, to be of my conception.

The rechargeable charger and lighter with solar, includes the following components:

1 is a heating element, which position can be manipulated, consisting of a filament coil 12, and is light weight to produce heat to ignite a desired product (e.g., cigarette).

2 is a battery holding generous amount of energy, encased in rubber.

3 is a housing for the charger and lighter with solar device, 4.5 centimeters by 4 centimeters, with sliding rails preexisting in front mold, that compliment male 8 and female adaptors motion 3A refers to the rear of mold and presents grooves that holds battery circuit board in place.

4 is the rear of circuit board capable of harnessing charge as well as dispense it, and operate an energy monitoring display.

The front of the circuit board, contains contacts to operate lighter and adaptors.

6 is the top to device with hinge and wiring to operate a solar panel 14. The device will make selected products solar power as well as power its own components through solar power.

7 is a female port to harness charge.

8 is a male port dispense charge to other devices.

9 is an energy display.

10 represents hinges that are attached between the housing 3 and top 6.

11 represents wiring between various components, where all components, through means of wiring, are connected to battery and circuit board to give the desired function.

To my knowledge any lighter rechargeable in its function complementing any other device in any state or form to be of my conception.

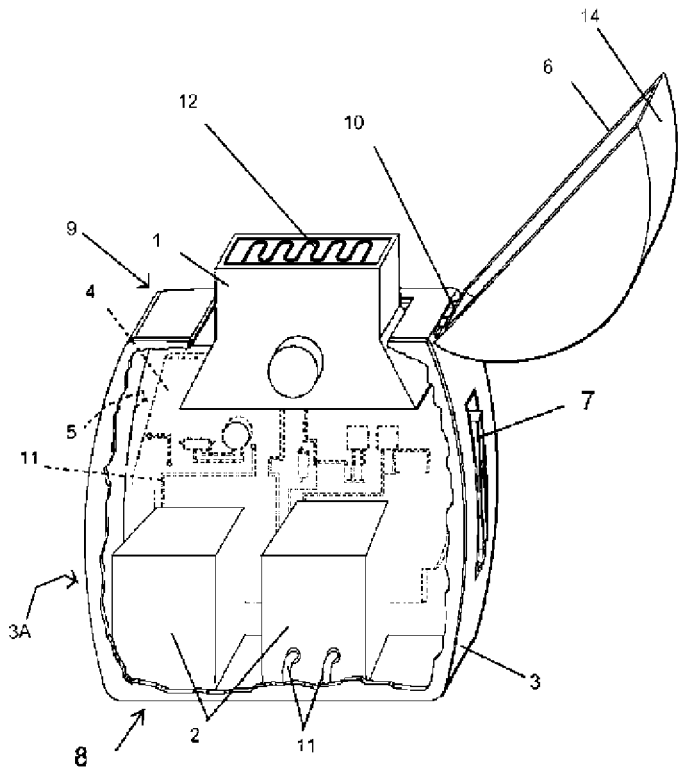

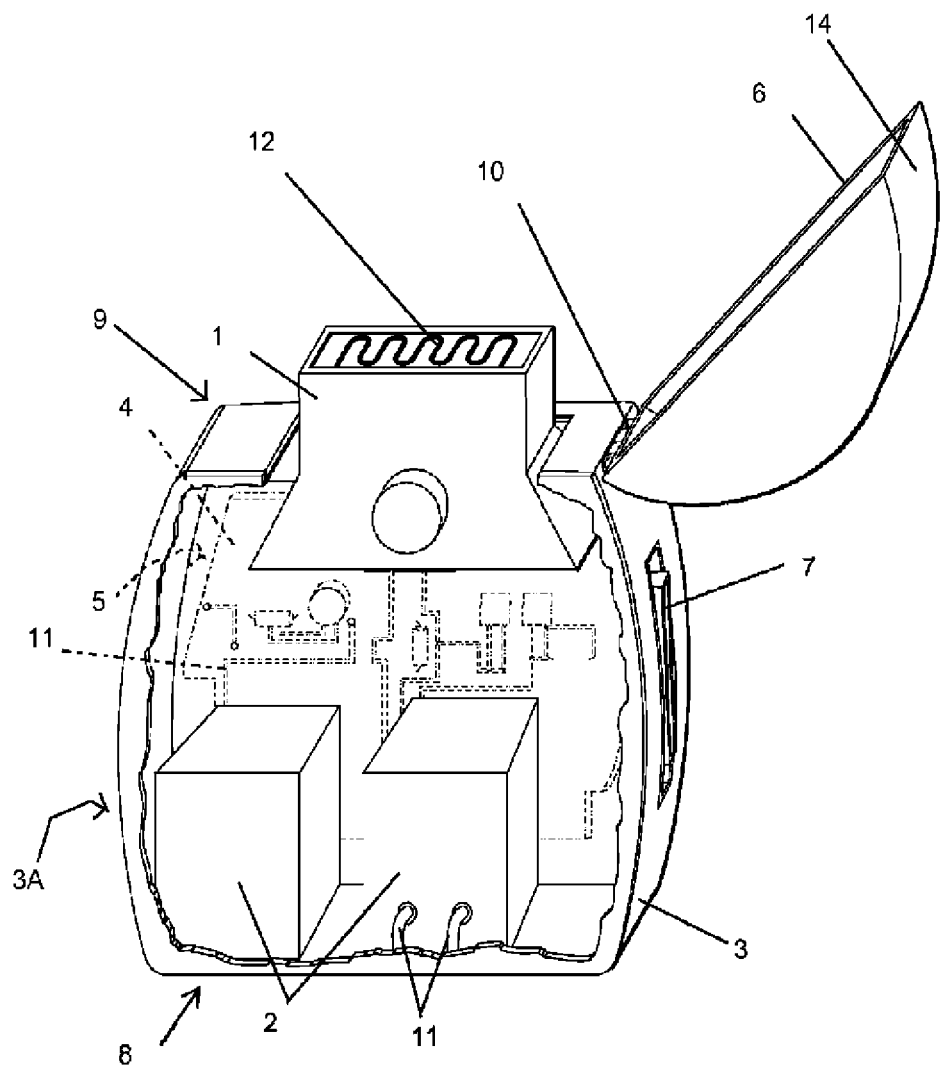

The invention claimed is:

1. A portable rechargeable charger lighter, comprising:
   a heating element;
   a battery;
   a circuit board capable of harnessing charge as well as dispensing charge to operate the heating element and adaptors;
   an egg-shaped housing having a hinged top with a solar panel, wherein the solar panel provides power to charge the battery;
   a first port to harness charge; and
   a second port to dispense charge to other devices;
   where all components, through means of wiring, are connected to the battery and circuit board to permit at least one of the ports, as well as the heating element, to be at least partially powered through solar power stored in the connected battery.

2. The rechargeable charger lighter according to claim 1, wherein said heating element consists of a filament coil to ignite a product.

3. The rechargeable charger lighter according to claim 1, wherein at least one of the first and second ports is a female port.

4. The rechargeable charger lighter according to claim 1, wherein at least one of the first and second ports is a male port.

5. The rechargeable charger lighter according to claim 1, further comprising an energy monitoring display.

6. The rechargeable charger lighter according to claim 1, wherein the circuit board further comprises contacts to operate the heating element.

7. The rechargeable charger lighter according to claim 1, wherein the circuit board further comprises contacts to operate the adaptors.

8. The rechargeable charger lighter according to claim 1, wherein the battery is encased in rubber.

\* \* \* \* \*

UNITED STATES PATENT AND TRADEMARK OFFICE
CERTIFICATE OF CORRECTION

| | |
|---|---|
| PATENT NO. | : 9,059,589 B2 |
| APPLICATION NO. | : 13/478784 |
| DATED | : June 16, 2015 |
| INVENTOR(S) | : Emmitt T. Wilson |

Page 1 of 3

It is certified that error appears in the above-identified patent and that said Letters Patent is hereby corrected as shown below:

Delete title page and substitute therefore with the attached title page consisting of the corrected illustrative figure;

In the drawings

Delete Drawing Sheet and substitute therefore with the attached Drawing Sheet showing corrected FIG. 1;

Sheet 1, the reference numeral "7" in the patent is changed to "8", and the reference numeral "8" in the patent is changed to "7";

In the specification

Column 1, line 44, after "The front" insert --(5)--;

In the claims

Column 2, line 20, (Claim 1), after the word "top" insert a --,--.

Signed and Sealed this
Third Day of May, 2016

Michelle K. Lee
*Director of the United States Patent and Trademark Office*

(12) United States Patent
Wilson

(10) Patent No.: US 9,059,589 B2
(45) Date of Patent: Jun. 16, 2015

(54) BUTANE FREE RECHARGEABLE CHARGER LIGHTER WITH SOLAR POWER

(76) Inventor: Emmitt Thomas Wilson, Rochester, NY (US)

(*) Notice: Subject to any disclaimer, the term of this patent is extended or adjusted under 35 U.S.C. 154(b) by 361 days.

(21) Appl. No.: 13/478,784

(22) Filed: Aug. 6, 2012

(65) Prior Publication Data
US 2014/0035508 A1 Feb. 6, 2014

(51) Int. Cl.
*H01M 10/44* (2006.01)
*H01M 10/46* (2006.01)
*H02J 7/00* (2006.01)
*F23Q 2/00* (2006.01)

(52) U.S. Cl.
CPC ............ *H02J 7/0042* (2013.01); *F23Q 2/00* (2013.01)

(58) Field of Classification Search
CPC ..... H02J 7/0042; H02J 7/0054; H02J 7/0055; H02J 7/35; F23Q 2/00; H01M 10/44; H01R 13/6675; H01R 31/065
USPC ................... 320/101, 107, 166, 110
See application file for complete search history.

(56) References Cited

U.S. PATENT DOCUMENTS

| | | | |
|---|---|---|---|
| 3,392,265 A | 7/1968 | King et al. | |
| 3,448,365 A | 6/1969 | Jacobson | |
| 3,621,196 A | 11/1971 | Sammel | |
| 3,934,302 A | 1/1976 | Mabuchi | |
| 4,254,761 A * | 3/1981 | Armas et al. | 126/680 |
| 4,288,209 A * | 9/1981 | Yoshinaga | 431/255 |
| D312,707 S | 12/1990 | Demory | |
| 5,235,157 A | 8/1993 | Blackburn | |
| 5,274,214 A | 12/1993 | Blackburn | |
| 5,285,050 A | 2/1994 | Blackburn | |
| 5,354,968 A | 10/1994 | Yamamura | |
| 6,644,303 B1 | 11/2003 | Worthington et al | |
| 8,228,024 B1 * | 7/2012 | Zander | 320/107 |
| 2008/0174989 A1 * | 7/2008 | Robinett | 362/183 |

* cited by examiner

Primary Examiner — Brian Ngo

(57) ABSTRACT

A lighter rechargeable in nature, and complimenting any other hand held device by means of electronic energy transfer.

8 Claims, 1 Drawing Sheet